July 30, 1957

P. DÉRIAZ 2,801,068

CONTROL OF FEATHERING RUNNER VANES OF HYDRAULIC
TURBINES AND PUMPS

Filed Nov. 5, 1954

INVENTOR

BY

ATTORNEY

United States Patent Office 2,801,068
Patented July 30, 1957

---

2,801,068

CONTROL OF FEATHERING RUNNER VANES OF HYDRAULIC TURBINES AND PUMPS

Paul Dériaz, Rugby, England, assignor to The English Electric Company Limited, London, England, a British company Application November 5, 1954, Serial No. 467,180

Claims priority, application Great Britain November 13, 1953

1 Claim. (Cl. 253—24)

The invention relates to the control of feathering runner vanes of rotary hydraulic flow reaction machines, i. e. hydraulic turbines and pumps having a rotary servo-motor built into the runner.

According to the invention a rotary hydraulic flow reaction machine comprises in combination: a runner, runner vanes having trunnions adjustably pivoted in the said runner about axes converging in a common point of intersection on the axis of rotation of the said runner, lever arms each fixedly attached to one of the said trunnions inside the said runner, a circular rotary hydraulic servo-motor located inside of and having one part fixedly connected and another part rotatable co-axially relative to the said runner, a central control member fixedly mounted on the said part of the servo-motor which is rotatable relative to the said runner, and a slotted guide gearing having pivoted slider blocks slidably engaging slots operatively connecting the said lever arms and the said central control member with one another, the pivot axes of all of the said slider blocks converging in the said common point of intersection of the axes of the said trunnions.

In order that the invention may be clearly understood and readily carried into effect, some embodiments of a feathering Francis type turbine or pump according to the invention will now be described by way of example with reference to the accompanying drawings in which.

Figure 1:
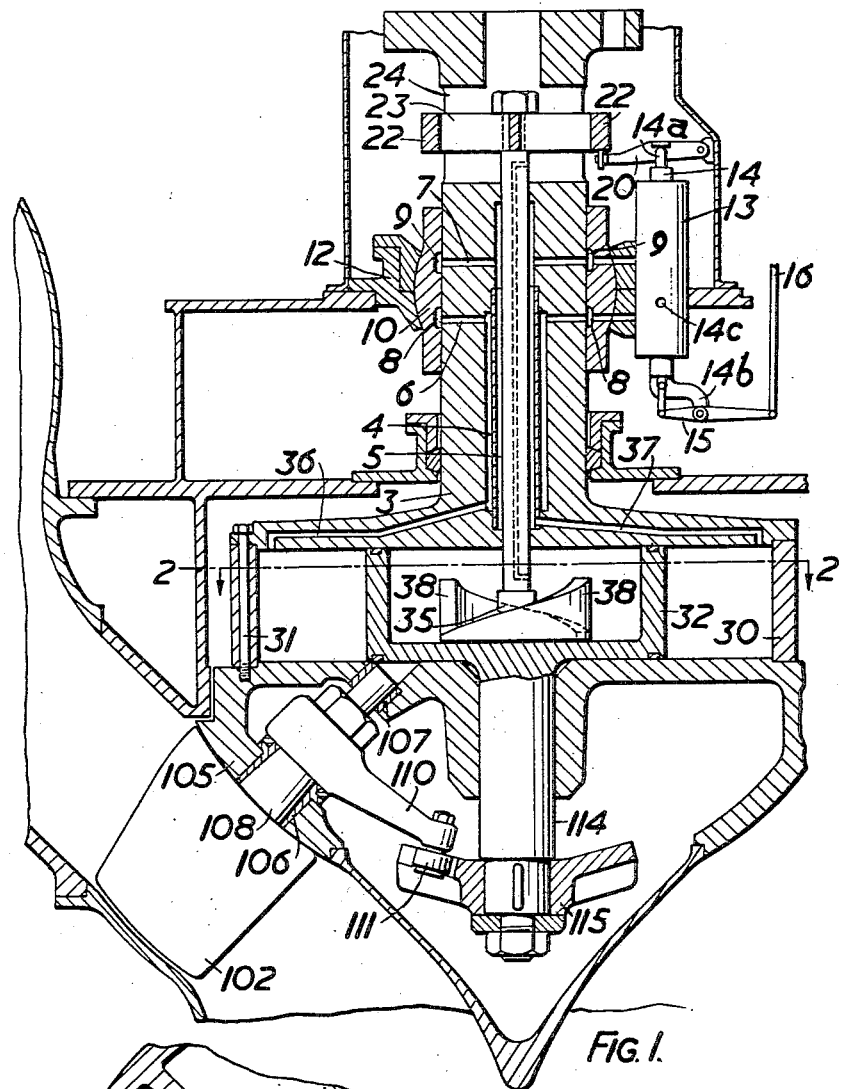
Fig. 1 is an axial section of one embodiment of the runner.
Figure 2:
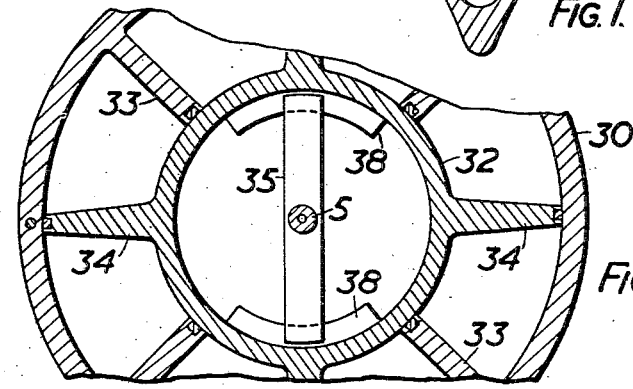
Fig. 2 is a cross section along the line 2—2 of Fig. 1.

Referring first to Figs. 1 and 2:

On the hollow runner shaft 3 the cylindrical servo-motor casing 30 and the hub portion 105 of the runner are attached by means of threaded bolts 31. The inner servo-motor drum 32 is arranged inside the servo-motor casing 30 and defines with the latter an annular space which is divided into compartments sealed off against one another by radial walls 33, 34 of the casing 30 and drum 32 respectively. The drum 32 is integral with a shaft 114 which is pivoted in the runner body 105 coxially with the runner shaft 3. The free end of the shaft 114 carries for example a radially slotted member 115 into which the arms 110 operating the runner vanes 102 engage with slider blocks or rollers 111. These runner vanes 102 have trunnions 108 pivoted in bearings 106, 107 of the hub portion 105.

The interior of the hollow runner shaft 3 is divided into two concentrical ducts by a tube 4 tightly fitted in the said hollow shaft at its ends and with ample clearance between its ends. A return motion rod 5 is slidably mounted with ample clearance within the said tube 4, but is sealed adjacent its ends against the runner shaft 3 and restrained from rotating relative to the same by radial arms 23 guided in slots 24 of the said shaft 3, which carry a ring 22 surrounding the said shaft 3.

Helical cams 38 are fixedly attached to the drum 32 in the interior thereof, and a transverse bar 35 attached to the lower end of the return motion rod 5 slidably engages these helical cams 38.

The sectors of the annular space between the servo-motor-casing 30 and servo-motor-drum 32 and the radial walls 33, 34 are connected by ducts 36, 37 alternately to the concentrical ducts inside and outside the tube 4, which are, in turn, in communication by radial bores 6, 7, respectively with circular grooves 8, 9, respectively, in a bearing sleeve 10 of the runner shaft 3 which sleeve is spherically mounted in the bearing casing 12, forming with it a self aligning bearing.

A distributor valve 13 is mounted in the said bearing casing 12, and contains the usual piston valve body 14. The latter has a bracket 14b on which a double-armed lever 15 is pivoted which is linked at one end to the inner rod 14a which is slidably mounted coaxially within the piston valve body 14 and co-operates at its other end with a lever arm 20 contacting the aforesaid ring 22 of the return motion rod 5. The other end of the two-armed lever 15 is connected by a rod 16 to control means (not shown), which may be the speed governor of a turbine or which may be operated at will by the operator of a pumping plant. Pressure oil is supplied to the distributor valve at 14c, and by the same through the grooves 8, 9 and bores 6, 7 respectively to the concentrical ducts outside or inside the tube 4, and from there to alternate compartments of the annular space of the servo-motor, the other compartments being similarly connected to drain.

The rotary motion of the drum 32 relative to the casing 30 of the servo-motor effected thereby is transmitted by the shaft 114, radially slotted member 115, arms 110 and trunnions 108 to the runner vanes 102 which are adjusted accordingly. On the other hand, the transverse bar 35 attached to the lower end of the return motion rod 5 rides on the helical cams 38 fixedly mounted in the interior of the drum 32, and is accordingly raised or lowered. This motion is transmitted by the ring 22 to the lever 20 which controls the discharge of pressure oil from the inner rod 14a of the distributor valve 13 and thereby effects a follow-up movement of the piston valve body 14 to a new equilibrium position.

Figure 3:
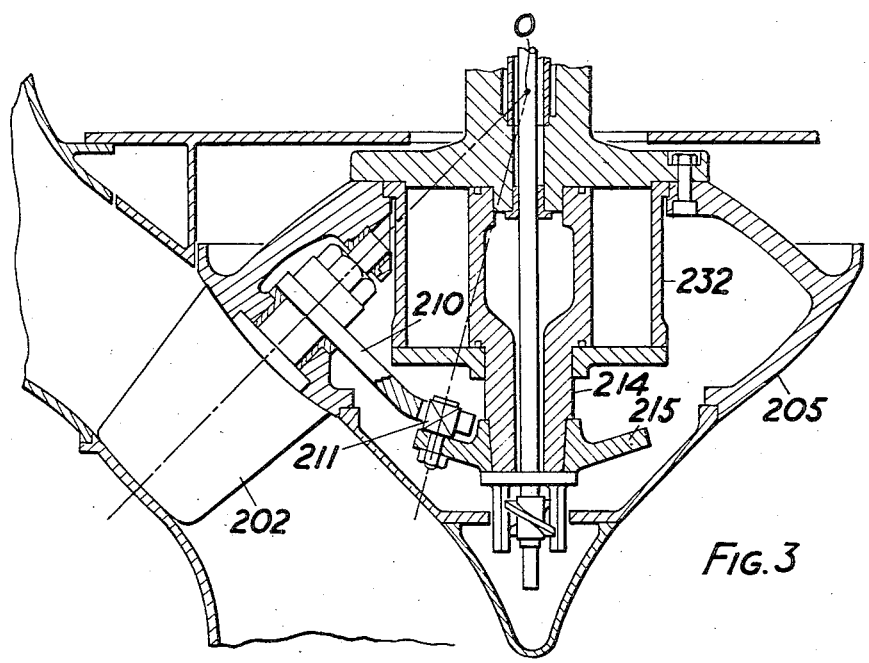
Fig. 3 is an axial part section of another embodiment of the runner.

The embodiment according to Fig. 3 shows a slightly modified construction: here the lever arms 210 of the runner vanes 202 have slotted ends, and slider blocks 211 are pivoted on the central control member 215 which is keyed to that portion 214 of the circular rotary servo-motor 232 which is rotatable relative to the runner hub 205. The pivot axes of the runner vanes 202 and slider blocks 211 converge in the same point O on the runner axis.

The present invention is equally applicable to the control of the feathering vanes of Kaplan type turbines and corresponding pumps, in which the axes of the runner vanes are substantially perpendicular to the axis of rotation of the runner shaft 3.

It will be seen from Fig. 1 that the axes of the slider blocks 111 converge in the same common intersecting point on the axis of rotation of the runner body 105 as the pivot axes of the trunnions 108 of the runner vanes 102. This geometrical relationship is maintained when the shaft 114 of the servo-motor is turned relative to the runner body 105, and all of the said vanes 102 are consequently adjusted about their pivot axes by the slider blocks 111 on their arm 110 engaging a slot in the central member 115 fixed on said shaft 114 and performing a motion having a radial component in its respective slot.

While I have herein described and illustrated in the accompanying drawings what may be considered a typical and particularly useful embodiment of my said invention, I wish it to be understood that I do not limit myself to the particular details and dimensions described and illustrated, for obivous modifications will occur to a person skilled in the art.

What I claim as my invention and desire to secure by Letters Patent, is:

A rotary hydraulic flow reaction machine comprising in combination: a runner, runner vanes having trunnions adjustably pivoted in the said runner about axes converging in a common point of intersection on the axis of rotation of the said runner, lever arms each fixedly attached to one of the said trunnions inside the said runner, a circular rotary hydraulic servo-motor located inside of and having one part fixedly connected and another part rotatable co-axially relative to the said runner, a central control member fixedly mounted on the said part of the servo-motor which is rotatable relative to the said runner, and a slotted guide gearing having pivoted slider blocks slidably engaging slots operatively connecting the said lever arms and the said central control member with one another, the pivot axes of all of the said slider blocks converging in the said common point of intersection of the axes of the said trunnions.

References Cited in the file of this patent

UNITED STATES PATENTS

| | | |
|---|---|---|
| 1,106,434 | Woodward | Aug. 11, 1914 |
| 1,716,134 | Huguenin | June 4, 1929 |
| 1,858,566 | Terry | May 17, 1932 |
| 1,892,404 | Messing | Dec. 27, 1932 |
| 1,897,834 | Biggs | Feb. 14, 1933 |
| 1,907,466 | Terry | May 9, 1933 |
| 1,948,478 | Biggs | Feb. 20, 1934 |
| 1,950,776 | Biggs | Mar. 13, 1934 |
| 1,962,382 | Biggs | June 12, 1934 |
| 1,962,385 | Biggs | June 12, 1934 |
| 2,224,638 | Ring et al. | Dec. 10, 1940 |
| 2,283,127 | Rheingans | May 12, 1942 |
| 2,606,533 | Garde et al. | Aug. 12, 1952 |
| 2,715,892 | Rodeck et al. | Aug. 23, 1955 |